(12) United States Patent
Jian

(10) Patent No.: US 10,086,860 B2
(45) Date of Patent: Oct. 2, 2018

(54) FLATBED TROLLEY WITH CASTERS CAPABLE OF NOT FOLDING WHEN HANDLE ROTATES

(71) Applicant: Shikun Jian, Yangjiang (CN)

(72) Inventor: Shikun Jian, Yangjiang (CN)

( * ) Notice: Subject to any disclaimer, the term of this patent is extended or adjusted under 35 U.S.C. 154(b) by 0 days.

(21) Appl. No.: 15/555,015

(22) PCT Filed: Nov. 27, 2015

(86) PCT No.: PCT/CN2015/095843
§ 371 (c)(1),
(2) Date: Aug. 31, 2017

(87) PCT Pub. No.: WO2017/088183
PCT Pub. Date: Jun. 1, 2017

(65) Prior Publication Data
US 2018/0037244 A1    Feb. 8, 2018

(30) Foreign Application Priority Data

Nov. 26, 2015  (CN) ..................... 2015 2 0952520 U

(51) Int. Cl.
*B62B 3/02* (2006.01)
*B62B 5/06* (2006.01)
(Continued)

(52) U.S. Cl.
CPC ............ *B62B 3/02* (2013.01); *B60B 33/0015* (2013.01); *B62B 3/022* (2013.01); *B62B 5/06* (2013.01);
(Continued)

(58) Field of Classification Search
CPC ....... B62B 2205/12; B62B 5/06; B62B 5/067; B62B 3/02; B62B 3/022
See application file for complete search history.

(56) References Cited

U.S. PATENT DOCUMENTS

| 4,274,644 A | 6/1981 | Taylor |
| 4,659,096 A * | 4/1987 | Leimgruber .............. B62B 3/02 |
| | | 280/39 |

(Continued)

FOREIGN PATENT DOCUMENTS

| CN | 201235840 Y | 5/2009 |
| WO | 2017088183 A1 | 6/2017 |

OTHER PUBLICATIONS

English translation of International Search Report for WO2017/088183 (priority document) dated Aug. 31, 2016 from ISA/CN for PCT/CN2015/095843.

(Continued)

*Primary Examiner* — Emma K Frick
(74) *Attorney, Agent, or Firm* — Davis, Malm & D'Agostine, P.C.

(57) ABSTRACT

The present invention discloses a flatbed trolley with casters capable of not folding when a handle rotates, which comprises a bearing frame (1), a handle (2), rotary frames (3), wheel carriers (4), and casters (5). The handle (2) is fixed at an upper portion of the bearing frame (1) via a connecting structure. The connecting structure comprises a left joint (14), a right joint (15), a left gear seat (12), a right gear seat (13), and a handle locking mechanism. The handle locking mechanism comprises a cross bar (7), locking blocks (8), connecting bars (9), switches (10), and a spring (11). The cross bar (7) is a hollow tube with an end being supported on the left gear seat (12) and the other end being supported on the right gear seat (13). An end of the cross bar (7) is provided with the locking block (8), wherein the locking block (8) is slidable along an extension direction of the cross bar (7). An end of the locking block (8) is connected to an end of the connecting bar (9), and the other end of the locking block is capable of inserting into the left joint (14) and the left gear seat (12) to lock them. The connecting bar (Continued)

(9) is installed within a hollow part of the cross bar (7), and the other end of the connecting bar is connected to the switch (10). Similarly, the other end of the cross bar (7) has a same structure. The spring (11) is provided between two switches (10), which thereby enables the casters be capable of not folding when the handle rotates.

10 Claims, 6 Drawing Sheets

(51) Int. Cl.
 *B60B 33/00* (2006.01)
 *B62B 3/14* (2006.01)
(52) U.S. Cl.
 CPC ............ *B62B 5/067* (2013.01); *B62B 3/1476* (2013.01); *B62B 2205/12* (2013.01); *B62B 2301/04* (2013.01)

(56) References Cited

U.S. PATENT DOCUMENTS

| | | | |
|---|---|---|---|
| 6,024,376 A * | 2/2000 | Golichowski | B62B 3/022 16/35 R |
| 6,733,026 B1 | 5/2004 | Robberson et al. | |
| 6,845,991 B1 | 1/2005 | Ritucci et al. | |
| 6,877,764 B2 * | 4/2005 | Sagol | B62B 5/06 280/47.371 |
| 7,229,093 B1 * | 6/2007 | Carter | B62B 3/022 280/641 |
| 7,588,257 B2 * | 9/2009 | Gu | B62B 3/16 280/32.6 |
| 7,784,816 B2 * | 8/2010 | Jian | B62B 3/02 280/38 |
| 7,819,409 B2 * | 10/2010 | Chang | B62B 5/0083 280/47.17 |
| 8,152,179 B2 * | 4/2012 | Yang | A61G 5/08 280/38 |
| 8,979,098 B2 * | 3/2015 | Wang | B62B 3/022 280/39 |
| 2014/0306428 A1 * | 10/2014 | Herbault | B62B 7/08 280/647 |

OTHER PUBLICATIONS

English translation of abstract (only) of CN201235840.

\* cited by examiner

FLATBED TROLLEY WITH CASTERS CAPABLE OF NOT FOLDING WHEN HANDLE ROTATES

TECHNICAL FIELD

The present invention belongs to the field of flatbed trolley, and more specifically, in particular relates to a flatbed trolley with casters capable of not folding when a handle rotates.

BACKGROUND

The existing flatbed trolley generally comprises a bearing frame, a handle, rotary frames, wheel carriers, casters and a rear lock seat. The handle of the existing flatbed trolley is usually parallel to the bearing frame when folded, and may be rotated and unfolded for 90 degrees to be perpendicular to the bearing frame when using. While the handle is unfolded, the handle will drive the rotary frame to drive the casters to rotate and unfold for 90 degrees to be perpendicular to the bearing frame. The flatbed trolley is pushed by holding the handle. The disadvantages of the existing flatbed trolley are that, when the handle is folded from a state perpendicular to the bearing frame to a state parallel to the bearing frame, it will also drive the rotary frame to drive the casters to fold to a position parallel to the bearing frame. When a cargo having a volume far beyond an area of the bearing frame is required to be put on the bearing frame, the handle in a state perpendicular to the bearing frame will often become an obstacle. If the handle is folded to be parallel to the bearing frame, the flatbed trolley cannot work.

SUMMARY OF THE INVENTION

An objective of the present invention is to provide a flatbed trolley with casters capable of not folding when a handle rotates, taking the above-described problems into consideration. The present invention makes the handle not in linkage with the casters when rotates. When the handle is rotated to be parallel to the bearing frame, the casters may still be perpendicular to the bearing frame, and the flatbed trolley may normally work.

The present invention is achieved by the following technical solution.

The present invention is a flatbed trolley with casters capable of not folding when a handle rotates, which comprises a bearing frame, a handle, rotary frames, wheel carriers, casters, and a rear lock seat. In particular, the caster is installed on the wheel carrier. The wheel carrier is fixed with the rotary frame. The rotary frame fits over an underframe tube provided at a bottom portion of the bearing frame and is capable of rotating relative to the underframe tube. The rear lock seat is disposed at a rear portion of the bearing frame and is capable of locking the rotary frame when the rotary frame rotates to a position perpendicular relative to the bearing frame. The handle is fixed at an upper portion of the bearing frame via a connecting structure. The connecting structure comprises a left joint, a right joint, a left gear seat, a right gear seat, and a handle locking mechanism. The left gear seat and the right gear seat are installed at both sides of the bearing frame respectively and are capable of rotating relative to the bearing frame and driving the rotary frame to rotate. An upper portion of the left joint is connected to a left vertical bar of the handle, and a lower portion of the left joint is connected to the left gear seat and is capable of rotating relatively. An upper portion of the right joint is connected to a right vertical bar of the handle, and a lower portion of the right joint is connected to the right gear seat and is capable of rotating relatively. The handle locking mechanism is capable of locking the left joint and the right joint with the left gear seat and the right gear seat, respectively, so that they cannot rotate relatively. The handle locking mechanism comprises a cross bar, locking blocks, connecting bars, switches, and a spring. The cross bar is a hollow tube with an end being supported on the left gear seat and the other end being supported on the right gear seat. An end of the cross bar is provided with the locking block. In particular, the locking block is slidable along an extension direction of the cross bar. An end of the locking block is connected to an end of the connecting bar, and the other end of the locking block is capable of inserting into the left joint and the left gear seat to lock them. The connecting bar is installed within a hollow part of the cross bar, and the other end of the connecting bar is connected to the switch. Similarly, the other end of the cross bar is provided with the locking block. In particular, the locking block is slidable along the extension direction of the cross bar. An end of the locking block is connected to an end of the connecting bar, and the other end of the locking block is capable of inserting into the right joint and the right gear seat to lock them. The connecting bar is installed within the hollow part of the cross bar, and the other end of the connecting bar is connected to the switch. The spring is provided between two switches.

The above-described locking block comprises a connecting block, an upper lockpin, and a lower lockpin. In particular, the connecting block is slidable along the hollow part of the cross bar, with an end being connected to the end of the connecting bar. The upper lockpin and the lower lockpin are arranged longitudinally symmetrical and parallel to each other. Both the upper lockpin and the lower lockpin are connected to the connecting block via a vertical connecting portion.

The above-described connecting block is provided with a strip-type through-hole having a same direction as the cross bar. The connecting block is connected to the cross bar via a connecting rivet provided at an end portion of the cross bar. The connecting rivet passes through the strip-type through-hole. The end portion of the cross bar is further provided with a notch having a shape and a size matching the vertical connecting portion.

The above-described switch comprises a sliding block and a pick. The sliding block is mounted within the cross bar and slidable along the hollow part of the cross bar, with an end being connected to the end of the connecting bar. The cross bar is provided with a strip-type pilot hole having a same direction as the cross bar on a wall of the cross bar at a position corresponding to the sliding block. The pick is mounted outside the cross bar. The pick is connected to the sliding block via a first screw. The first screw passes through the strip-type pilot hole and is slidable along the strip-type pilot hole.

The other end of the above-described sliding block is provided with a protruding pillar for fixing the spring.

The lower portion of the above-described left joint is provided with a sleeve hole. An outer side of the left gear seat is correspondingly provided with a sleeve pillar. The sleeve hole provided at the lower portion of the left joint fits over the sleeve pillar provided on the left gear seat. The sleeve pillar is a hollow cylinder provided with a through-hole. A second screw is placed into a side of the through-hole. A nut matching the second screw is placed into the other side of the through-hole to lock the left joint and the left gear seat in a horizontal direction. An installing structure of the right joint and right gear seat is the same as an installing structure of the left joint and the left gear seat.

An inner side of the above-described left gear seat is provided with a pair of spaced and symmetrical connecting pieces for supporting the cross bar on a same horizontal line as the sleeve pillar. The pair of connecting pieces is embeddable into the hollow part of the end portion of the cross bar, and a distance between the pair of connecting pieces is sufficient for the connecting block to pass through. The connecting piece is further provided with a circular pilot hole for installing the connecting rivet.

Upper and lower edges of the above-described connecting piece are provided with an inwardly facing lateral turnup. A space enclosed by the connecting piece and the lateral turnup is a guide-track groove. Guiding blocks matching the guide-track groove are provided on two sides of the connecting block which correspond to the connecting piece.

The above-described left gear seat and the right gear seat are provided with limiting pieces. The limiting pieces are capable of limiting a maximum rotation angle of the left joint and the right joint as 90 degrees.

The above-described rotary frame is provided with a gear piece and a gear matching the gear seat. The gear seat is capable of driving the gear to drive the rotary frame to rotate when the gear seat rotates. The rotary frames on the same underframe tube are connected in series via a linkage bar. The linkage bar is provided with a locking hole at an end close to the gear seat. The rear lock seat is provided with a locking bolt corresponding to the locking hole. When the handle is unfolded, the gear seat drives the rotary frame to rotate, and the gear piece is capable of impacting the locking bolt to make the rear lock seat backwards. When the handle is unfolded to be perpendicular relative to the bearing frame, the locking bolt of the rear lock seat is capable of inserting into the locking hole of the linkage bar to lock the rotary frame.

The advantages of the present invention lie in follows. Locking the left joint and the right joint with the left gear seat and the right gear seat respectively via the handle locking mechanism may realize linkage. After unlocking, the left joint and the right joint are capable of rotating relative to the left gear seat and the right gear seat, respectively. When in linkage, the casters may be driven to unfold or fold during unfolding or folding of the handle. It is convenient to switchover the working state and off-working state of the flatbed trolley. When relatively rotates, the casters will not act and keeps an original unfolded state when the handle is folded, and the flatbed trolley may be used normally. In addition, when the handle is relatively parallel to the bearing frame, a cargo having a volume beyond an area of the bearing frame may be put on the bearing frame. Applicability is strong and cargo capacity is also strong.

DETAILED DESCRIPTION OF THE PREFERRED EMBODIMENT

Figure 1:
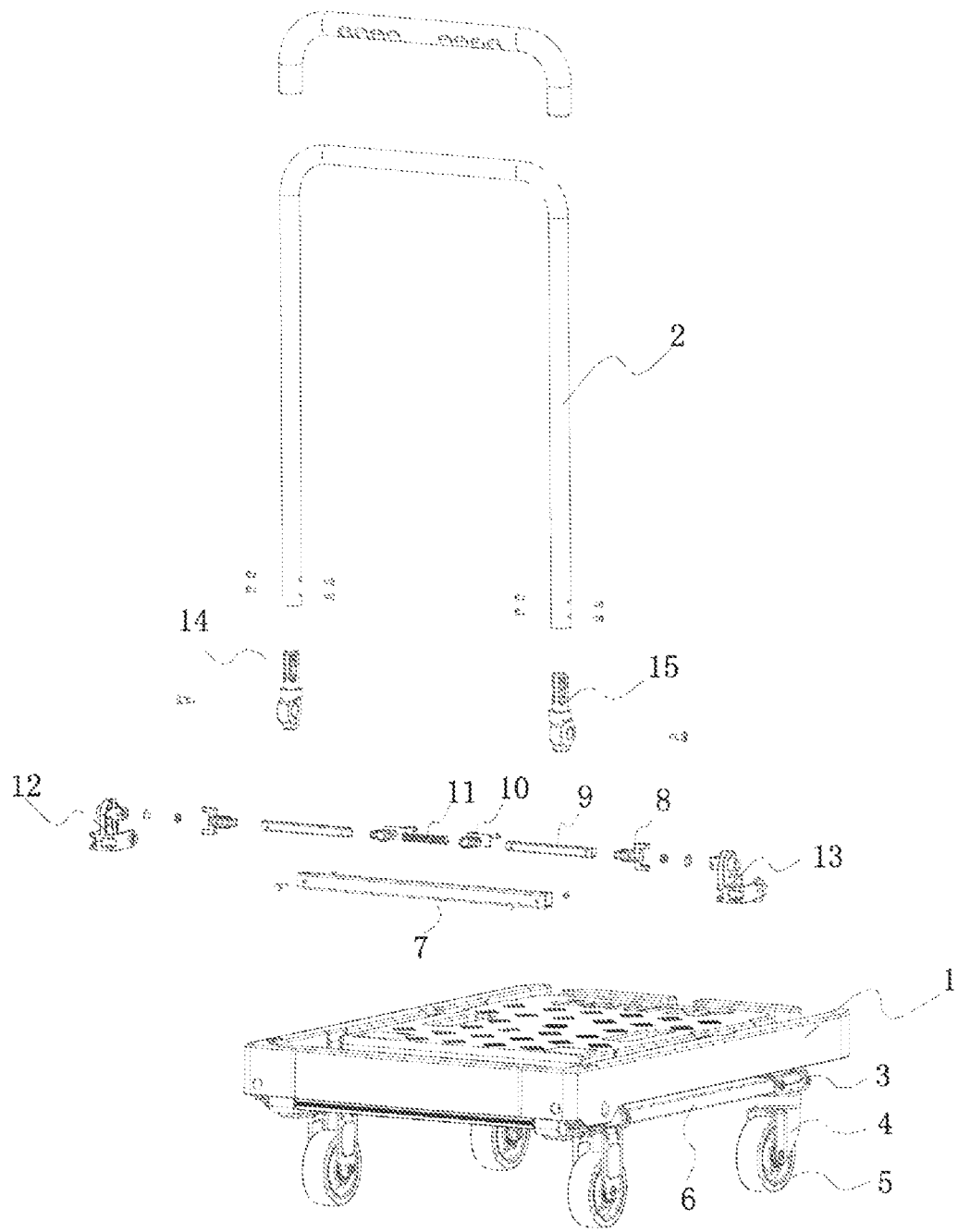
FIG. 1 is a schematic view of an exploded structure according to the present invention.

The present invention is further described below in combination with the accompanying drawings.

The present invention comprises a bearing frame 1, a handle 2, rotary frames 3, wheel carriers 4, casters 5, and a rear lock seat 21. In particular, the caster 5 is installed on the wheel carrier 4. The wheel carrier 4 is fixed with the rotary frame 3. The rotary frame 3 fits over an underframe tube 20 provided at a bottom portion of the bearing frame 1 and is capable of rotating relative to the underframe tube 20. The rear lock seat 21 is disposed at a rear portion of the bearing frame 1 and is capable of locking the rotary frame 3 when the rotary frame rotates to a position perpendicular relative to the bearing frame 1. The handle 2 is fixed at an upper portion of the bearing frame 1 via a connecting structure. The connecting structure comprises a left joint 14, a right joint 15, a left gear seat 12, a right gear seat 13, and a handle locking mechanism. The left gear seat 12 and the right gear seat 13 are installed at both sides of the bearing frame 1, respectively, and are capable of rotating relative to the bearing frame 1 and driving the rotary frame 3 to rotate. An upper portion of the left joint 14 is connected to a left vertical bar of the handle 2, and a lower portion of the left joint 14 is connected to the left gear seat 12 and is capable of rotating relatively. An upper portion of the right joint 15 is connected to the right vertical bar of the handle 2, and a lower portion of the right joint is connected to the right gear seat 13 and is capable of rotating relatively. The handle locking mechanism is capable of locking the left joint 14 and the right joint 15 with the left gear seat 12 and the right gear seat 13, respectively, so that they cannot rotate relatively.

Figure 2:
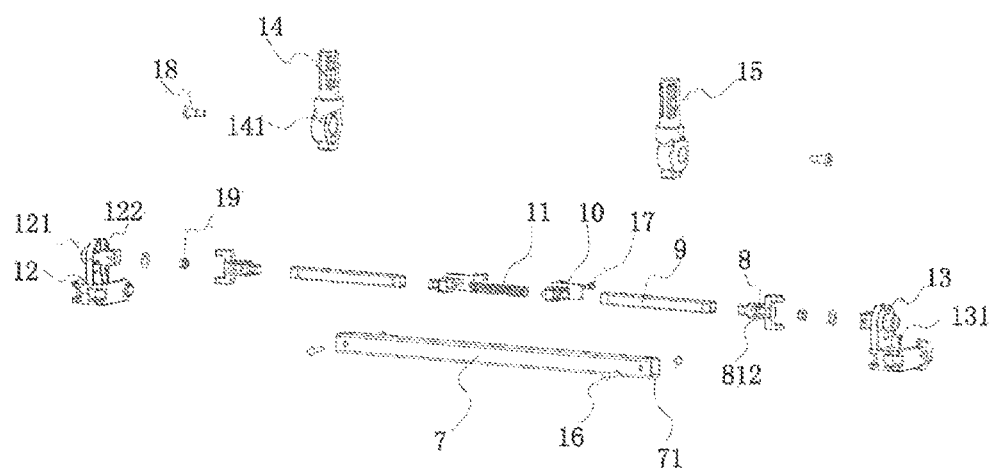
FIG. 2 is a schematic view of an exploded structure of a connecting structure and a handle locking mechanism according to the present invention.
Figure 3:
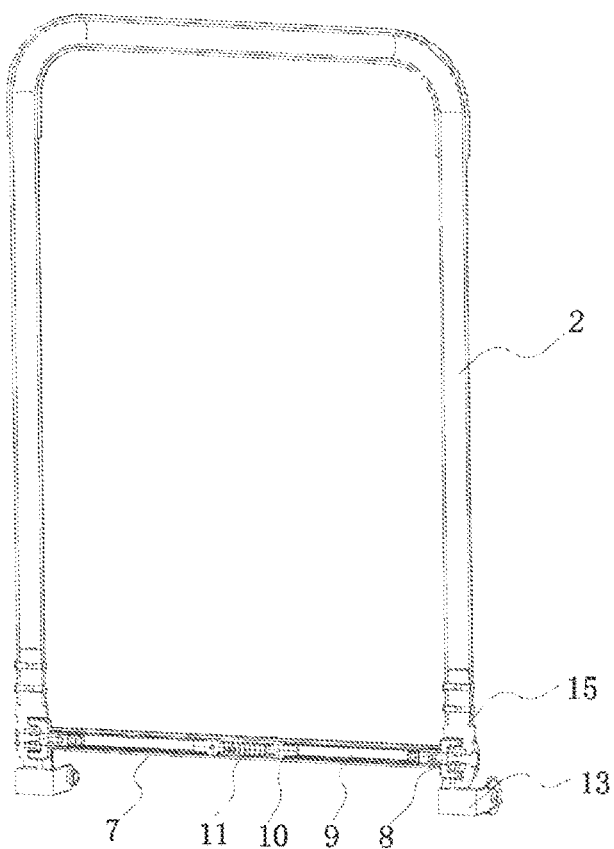
FIG. 3 is a schematic view of a sectional structure of a connecting structure and a handle locking mechanism according to the present invention.

As shown in FIG. 1, FIG. 2 and FIG. 3, in the present embodiment, the handle locking mechanism comprises a cross bar 7, locking blocks 8, connecting bars 9, switches 10, and a spring 11. The cross bar 7 is a hollow tube with an end being supported on the left gear seat 12 and the other end being supported on the right gear seat 13. An end of the cross bar 7 is provided with the locking block 8. In particular, the locking block 8 is slidable along an extension direction of the cross bar 7. An end of the locking block 8 is connected to an end of the connecting bar 9, and the other end of the locking block is capable of inserting into the left joint 14 and the left gear seat 12 to lock them. The connecting bar 9 installed within the hollow part of the cross bar 7, and the other end of the connecting bar is connected to the switch 10. Similarly, the other end of the cross bar 7 is provided with the locking block 8. In particular, the locking block 8 is slidable along the extension direction of the cross bar 7. An end of the locking block 8 is connected to an end of the connecting bar 9, and the other end of the locking block is capable of inserting into the right joint 15 and the right gear seat 13 to lock them. The connecting bar 9 is installed within the hollow part of the cross bar 7, and the other end of the connecting bar is connected to the switch 10. The spring 11 is provided between two switches 10. When touching the two switch 10 to close up by hand, the connecting bar 9 may be driven to pull the locking block 8, such that the locking block 8 is separated from the left joint 14 and the left gear seat 12, and also separated from the right joint 15 and the right gear seat 13, causing the left joint 14 and the left gear seat 12 be capable of rotating relatively, and the right joint 15 and the right gear seat 13 be capable of rotating relatively.

Figure 4:
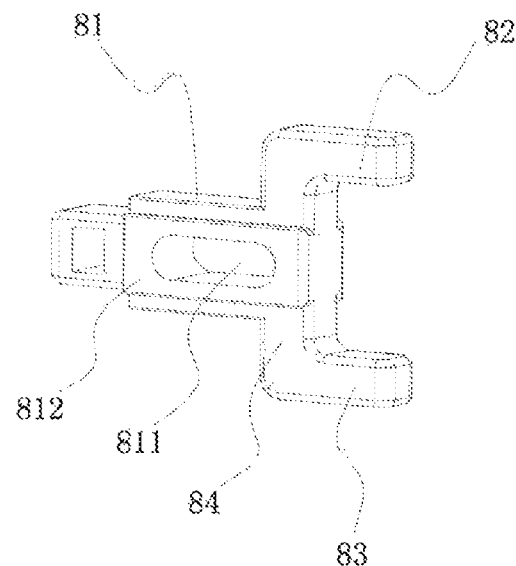
FIG. 4 is a schematic view of a structure of a locking block according to the present invention.

As a further improvement, as shown in FIG. 4, the locking block 8 comprises a connecting block 81, an upper lockpin 82, and a lower lockpin 83. In particular, the connecting block 81 is slidable along the hollow part of the cross bar 7, with an end of the connecting block being connected to the end of the connecting bar 9. The upper lockpin 82 and the lower lockpin 83 are arranged longitudinally symmetrical and parallel to each other. Both the upper lockpin and the lower lockpin are connected to the connecting block 81 via a vertical connecting portion 84. Both lockpins can achieve better locking effects and have a high stability. In particular, the connecting block 81 is provided with a strip-type through-hole 811 having a same direction as the cross bar 7. The connecting block 81 is connected to the cross bar 7 via a connecting rivet 16 provided at an end portion of the cross bar 7. The connecting rivet 16 passes through the strip-type through-hole 811. The end portion of the cross bar 7 is further provided with a notch 71 having a shape and a size matching the vertical connecting portion 84. The above-described structure may improve the sliding stationarity of the connecting block 81, and may ensure that it won't separate from the cross bar 7.

Figure 5:
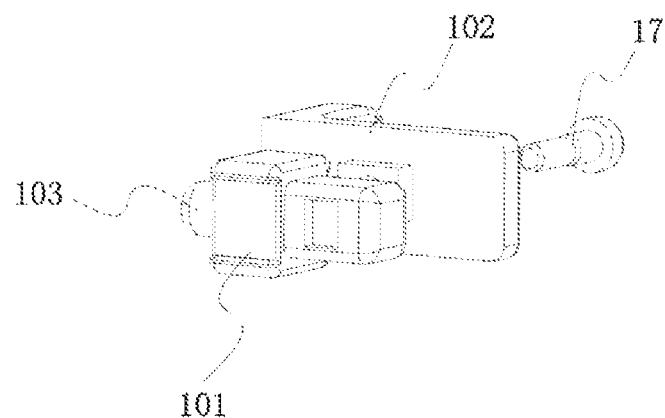
FIG. 5 is a schematic view of a structure of a switch according to the present invention.

As a further improvement, as shown in FIG. 5, in order to facilitate installation, the switch 10 comprises a sliding block 101 and a pick 102. The sliding block 101 is mounted within the cross bar 7 and is slidable along the hollow part of the cross bar 7, with an end of the sliding block being connected to the end of the connecting bar 9. The cross bar 7 is provided with a strip-type pilot hole having a same direction as the cross bar 7 on a wall of the cross bar at a position corresponding to the sliding block 101. The pick 102 is mounted outside the cross bar 7. The pick is connected to the sliding block 101 via a first screw 17. The first screw 17 passes through the strip-type pilot hole and is slidable along the strip-type pilot hole. The other end of the sliding block 101 is provided with a protruding pillar 103 for fixing the spring 11, to prevent the spring 11 from moving.

In the present embodiment, the lower portion of the left joint 14 is provided with a sleeve hole 141. An outer side of the left gear seat 12 is correspondingly provided with a sleeve pillar 121. The sleeve hole 141 provided at the lower portion of the left joint 14 fits over the sleeve pillar 121 provided on the left gear seat 12. The sleeve pillar 121 is a hollow cylinder provided with through-hole. A second screw 18 is placed into a side of the through-hole. A nut 19 matching the second screw 18 is placed into the other side of the through-hole to lock the left joint 14 and the left gear seat 12 in a horizontal direction. An installing structure of the right joint 15 and the right gear seat 13 is the same as an installing structure of the left joint 14 and the left gear seat 12.

Figure 6:
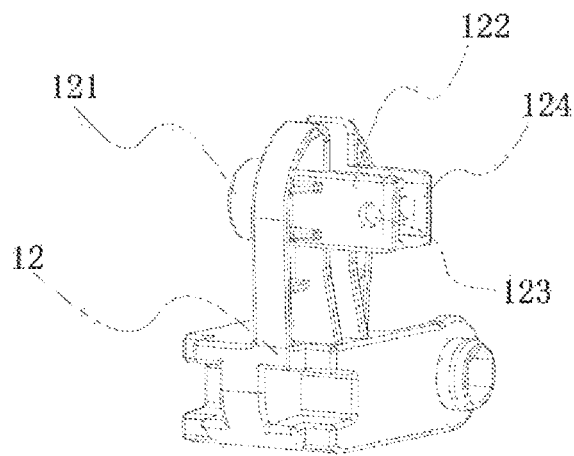
FIG. 6 is a schematic view of a structure of a left gear seat according to the present invention.

As a further improvement, as shown in FIG. 6, an inner side of the left gear seat 12 is provided with a pair of spaced and symmetrical connecting pieces 122 for supporting the cross bar 7 on a same horizontal line as the sleeve pillar 121. The pair of connecting pieces 122 is embeddable into the hollow part of the end portion of the cross bar 7, and a distance between the pair of connecting pieces 122 is sufficient for the connecting block 81 to pass through. The connecting piece 122 is further provided with a circular pilot hole 123 for installing the connecting rivet 16. In particular, upper and lower edges of the connecting piece 122 are provided with an inwardly facing lateral turnup. A space enclosed by the connecting piece 122 and the lateral turnup is a guide-track groove 124. Guiding blocks 812 matching the guide-track groove 124 are provided on two sides of the connecting block 81 which correspond to the connecting piece 122, to improve stability of connecting block 81 when sliding.

As a further improvement, as shown in FIG. 2, the left gear seat 12 and the right gear seat 13 are provided with limiting pieces 131. The limiting pieces 131 are capable of limiting a maximum rotation angle of the left joint 14 and the right joint 15 as 90 degrees, to prevent the handle 2 from over rotating to affect the use, and also be convenient for the handle locking mechanism to lock the handle 2.

Figure 7:
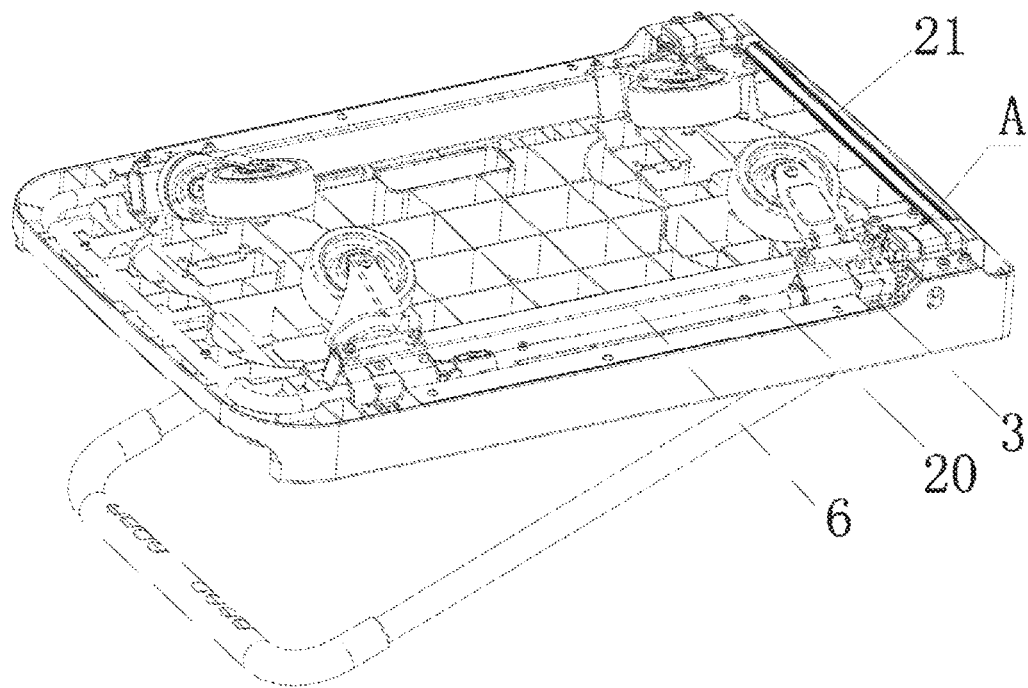
FIG. 7 is a schematic view of a structure of an underside of a bearing frame according to the present invention.
Figure 8:
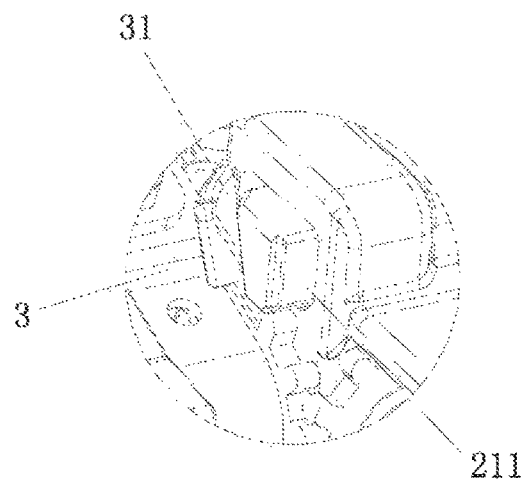
FIG. 8 is a schematic view of a local enlarged structure of an A portion in FIG. 7.
Figure 9:
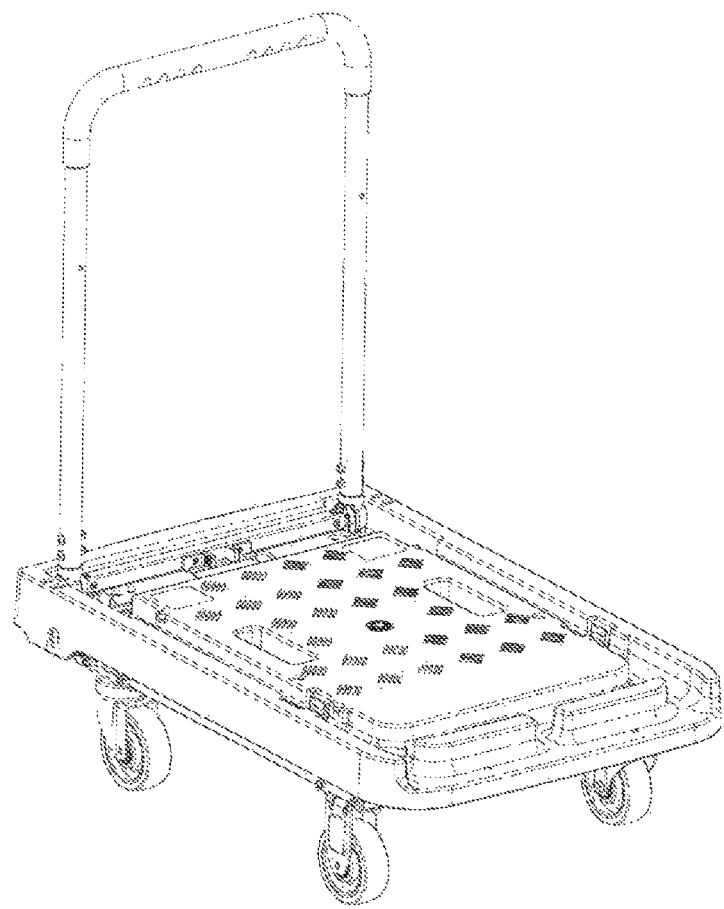
FIG. 9 is a schematic view according to the present invention when a handle and casters are unfolded for 90 degrees.
Figure 10:
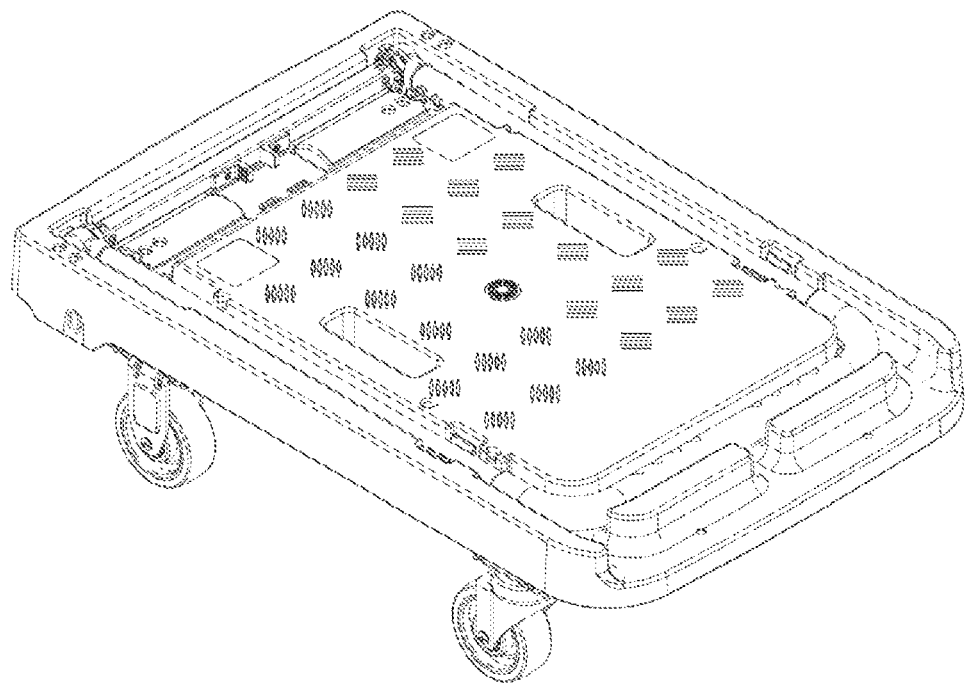
FIG. 10 is a schematic view according to the present invention when a handle is parallel to a bearing frame and casters are unfolded for 90 degrees.
Figure 11:
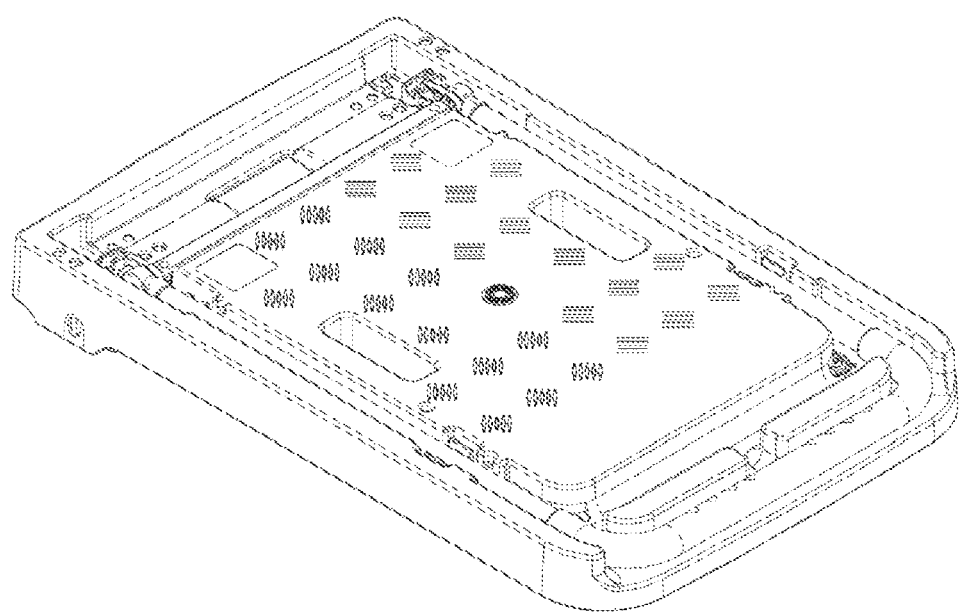
FIG. 11 is a schematic view according to the present invention when a handle and casters are parallel to a bearing frame.

As a further improvement, as shown in FIG. 7 and FIG. 8, the above-described rotary frame 3 is provided with a gear piece 31 and a gear matching the gear seat. The gear seat is capable of driving the gear to drive the rotary frame 3 when the gear seat rotates. The rotary frames 3 on the same underframe tube 20 are connected in series via a linkage bar 6. The linkage bar 6 is provided with a locking hole at an end close to the gear seat. The rear lock seat 21 is provided with a locking bolt 211 corresponding to the locking hole. When the handle 2 is unfolded, gear seat drives the rotary frame 3 to rotate, and the gear piece 31 is capable of impacting the locking bolt 211 to make the rear lock seat 21 backwards. When the handle 2 is unfolded to be perpendicular relative to the bearing frame 1, the locking bolt 211 of the rear lock seat 21 is capable of inserting into the locking hole of the linkage bar 6 to lock the rotary frame 3.

When using the present invention, first is to rotate and unfold the handle 2, and the handle 2 will drive the rotary frame 3 to drive the casters 4 to unfold until perpendicular to the bearing frame 1 via the gear seat during rotation. The locking bolt 211 of the rear lock seat 21 will insert into the locking hole of the linkage bar 6 to lock the casters 4 to prevent them from folding, and the handle 2 cannot rotate at the same time. When the handle 2 and the casters 4 are required to be folded simultaneously, pull the rear lock seat 21 to cause its locking bolt 211 exits from the locking hole of the linkage bar 6. At this point, rotating the handle 2 may drive the casters 4 to rotate until parallel to the bearing frame 1. When keeping the casters 4 unfolded and only folding the handle 2 are required, only need to touch the switch 10 of the handle locking mechanism, then the locking block 8 may be separated from the joint and the gear seat. The handle 2 may rotate relative to the gear seat, until parallel to the bearing frame 1, which is suitable for placing a big cargo.

The above-described implementations of the present invention do not form a limitation to the scope of protection of the present invention. Any modification, equivalent replacement, improvement and the like, made within the spirit and principle of the present invention, shall all be included within the scope of protection of the claims of the present invention.

What is claimed:

1. A flatbed trolley with at least one caster capable of not folding when a handle rotates, comprising a bearing frame, the handle, at least one rotary frame, at least one wheel carrier, at least one caster, and a rear lock seat, wherein the caster is installed on the wheel carrier, the wheel carrier is fixed with the rotary frame, the rotary frame fits over an underframe tube provided at a bottom portion of the bearing frame and is capable of rotating relative to the underframe tube, the rear lock seat is disposed at a rear portion of the bearing frame and is capable of locking the rotary frame when the rotary frame rotates to a position perpendicular relative to the bearing frame, the handle is fixed at an upper portion of the bearing frame via a connecting structure, the connecting structure comprises a left joint, a right joint, a left gear seat, a right gear seat, and a handle locking mechanism, the left gear seat and the right gear seat are installed at both sides of the bearing frame respectively and are capable of rotating relative to the bearing frame and driving the rotary frame to rotate, an upper portion of the left joint is connected to a left vertical bar of the handle, a lower portion of the left joint is connected to the left gear seat and is capable of rotating relatively, an upper portion of the right joint is connected to a right vertical bar of the handle, a lower portion of the right joint is connected to the right gear seat and is capable of rotating relatively, and the handle locking mechanism is capable of locking the left joint and the right joint with the left gear seat and the right gear seat, respectively, so that they cannot rotate relatively, characterized in that, the handle locking mechanism comprises a cross bar, at least one locking block, at least one connecting bar, at least one switch, and a spring, the cross bar is a hollow tube with an end being supported on the left gear seat and the other end being supported on the right gear seat, the cross bar is provided with the locking block, wherein the locking block is slidable along an extension direction of the cross bar, an end of the locking block is connected to an end of the connecting bar, the other end of the locking block is capable of inserting into the left joint and the left gear seat to lock them, the connecting bar is installed within a hollow part of the cross bar, the other end of the connecting bar is connected to the switch; similarly, the other end of the cross bar is provided with the locking block, wherein the locking block is slidable along the extension direction of the cross bar, an end of the locking block is connected to an end of the connecting bar, the other end of the locking block is capable of inserting into the right joint and the right gear seat to lock them, the connecting bar is installed within the hollow part of the cross bar, the other end of the connecting bar is connected to the switch, and the spring is provided between two switches.

2. The flatbed trolley with the caster capable of not folding when the handle rotates according to claim 1, wherein the locking block comprises a connecting block, an upper lockpin, and a lower lockpin, wherein the connecting block is slidable along the hollow part of the cross bar, with an end of the connecting block being connected to the end of the connecting bar, the upper lockpin and the lower lockpin being arranged longitudinally symmetrical and parallel to each other, both the upper lockpin and the lower lockpin being connected to the connecting block via a vertical connecting portion.

3. The flatbed trolley with the caster capable of not folding when the handle rotates according to claim 2, wherein the connecting block is provided with a strip-type through-hole having a same direction as the cross bar, the connecting block being connected to the cross bar via a connecting rivet provided at an end portion of the cross bar, the connecting rivet passing through the strip-type through-hole, the end portion of the cross bar being further provided with a notch having a shape and a size matching the vertical connecting portion.

4. The flatbed trolley with the caster capable of not folding when the handle rotates according to claim 3, wherein the switch comprises a sliding block and a pick, the sliding block being mounted within the cross bar and slidable along the hollow part of the cross bar, with an end of the sliding block being connected to the end of the connecting bar, the cross bar being provided with a strip-type pilot hole having a same direction as the cross bar on a wall of the cross bar at a position corresponding to the sliding block, the pick being mounted outside the cross bar, the pick being connected to the sliding block via a first screw, the first screw passing through the strip-type pilot hole and being slidable along the strip-type pilot hole.

5. The flatbed trolley with the caster capable of not folding when the handle rotates according to claim 4, wherein the other end of the sliding block is provided with a protruding pillar for fixing the spring.

6. The flatbed trolley with the caster capable of not folding when the handle rotates according to claim 3, wherein the lower portion of the left joint is provided with a sleeve hole, an outer side of the left gear seat being correspondingly provided with a sleeve pillar, the sleeve hole provided at the lower portion of the left joint fitting over the sleeve pillar provided on the left gear seat, the sleeve pillar being a hollow cylinder provided with a through-hole, a second screw being placed into a side of the through-hole, a nut matching the second screw being placed into the other side of the through-hole to lock the left joint and the left gear seat in a horizontal direction.

7. The flatbed trolley with the caster capable of not folding when the handle rotates according to claim 6, wherein an inner side of the left gear seat is provided with a pair of spaced and symmetrical connecting pieces for supporting the cross bar on a same horizontal line as the sleeve pillar, the pair of connecting pieces being embeddable into the hollow part of the end portion of the cross bar and a distance between the pair of connecting pieces being sufficient for the connecting block to pass through, the connecting piece being further provided with a circular pilot hole for installing the connecting rivet.

8. The flatbed trolley with the caster capable of not folding when the handle rotates according to claim 7, wherein upper and lower edges of the connecting piece are provided with an inwardly facing lateral turnup, a space enclosed by the connecting piece and the lateral turnup being a guide-track groove, guiding blocks matching the guide-track groove being provided on two sides of the connecting block which correspond to the connecting piece.

9. The flatbed trolley with the caster capable of not folding when the handle rotates according to claim 8, wherein the left gear seat and the right gear seat are provided with limiting pieces, the limiting pieces being capable of limiting a maximum rotation angle of the left joint and the right joint as 90 degrees.

10. The flatbed trolley with the caster capable of not folding when the handle rotates according to claim 1, wherein the rotary frame is provided with a gear piece and a gear matching the gear seat, the gear seat being capable of driving the gear to drive the rotary frame to rotate when the gear seat rotates, the rotary frame on the same underframe tube being connected in series via a linkage bar, the linkage bar being provided with a locking hole at an end close to the gear seat, the rear lock seat being provided with a locking bolt corresponding to the locking hole; when the handle is unfolded, the gear seat drives the rotary frame to rotate, and the gear piece is capable of impacting the locking bolt to make the rear lock seat backwards; when the handle is unfolded to be perpendicular relative to the bearing frame, the locking bolt of the rear lock seat is capable of inserting into the locking hole of the linkage bar to lock the rotary frame.

\* \* \* \* \*